United States Patent
Naganathan et al.

(10) Patent No.: US 10,095,507 B1
(45) Date of Patent: *Oct. 9, 2018

(54) IMAGE UPGRADE FOR DEVICES IN A TELEPHONY SYSTEM

(71) Applicant: ShoreTel, Inc., Sunnyvale, CA (US)

(72) Inventors: Venkatraman Naganathan, Sunnyvale, CA (US); Glen Okita, Sunnyvale, CA (US)

(73) Assignee: Mitel Networks, Inc., DE (US)

( * ) Notice: Subject to any disclaimer, the term of this patent is extended or adjusted under 35 U.S.C. 154(b) by 30 days.

This patent is subject to a terminal disclaimer.

(21) Appl. No.: 15/451,457

(22) Filed: Mar. 7, 2017

Related U.S. Application Data

(63) Continuation of application No. 14/857,749, filed on Sep. 17, 2015, now Pat. No. 9,600,268, which is a continuation of application No. 12/897,573, filed on Oct. 4, 2010, now Pat. No. 9,158,525.

(51) Int. Cl.
    G06F 9/44      (2018.01)
    *G06F 8/65*    (2018.01)
    *H04M 7/00*    (2006.01)
    G06F 9/54      (2006.01)

(52) U.S. Cl.
    CPC ............... *G06F 8/65* (2013.01); *G06F 9/542* (2013.01); *H04M 7/006* (2013.01)

(58) Field of Classification Search
    CPC .......................................... G06F 8/65
    USPC ............................................ 717/173
    See application file for complete search history.

(56) References Cited

U.S. PATENT DOCUMENTS

| 5,974,312 | A  | 10/1999 | Hayes et al. |
| 6,009,274 | A  | 12/1999 | Fletcher et al. |
| 6,108,782 | A  | 8/2000  | Fletcher et al. |
| 6,151,643 | A  | 11/2000 | Cheng et al. |
| 6,151,708 | A  | 11/2000 | Pedrizetti |
| 6,324,649 | B1 | 11/2001 | Eyres |
| 6,614,804 | B1 | 9/2003  | McFadden |
| 6,647,210 | B1 | 11/2003 | Toyoda et al. |
| 6,657,957 | B1 | 12/2003 | Cheung et al. |
| 6,754,823 | B1 | 6/2004  | Kurzwell |

(Continued)

FOREIGN PATENT DOCUMENTS

EP          2317728 A1       5/2011

OTHER PUBLICATIONS

Avaya Communication Manager Network Region Configuration Guide, Jul. 2004, 24 pages.

(Continued)

*Primary Examiner* — Francisco Aponte

(57) ABSTRACT

A system for image upgrade, according to one embodiment of the present invention comprises an upgrade director and a target device comprising a manager module. The upgrade director sends a first command to the manager module initiating an upgrade event. The manager module receives the first command. The manager module calculates a delay parameter. The manager module downloads an upgrade image after the delay parameter has ended. The upgrade director sends a second command to the manager module indicating that the upgrade event is to conclude. The manager module receives the second command from the upgrade director. The manager module reboots using the upgrade image responsive to the second command.

17 Claims, 11 Drawing Sheets

(56) References Cited

U.S. PATENT DOCUMENTS

| | | |
|---|---|---|
| 6,789,255 B1 | 9/2004 | Pedrizetti |
| 6,986,133 B2 | 1/2006 | O'Brien |
| 7,200,549 B1 | 4/2007 | Fujii |
| 7,222,195 B2 | 5/2007 | Das et al. |
| 7,222,340 B2 | 5/2007 | Willis, II |
| 7,237,122 B2 | 6/2007 | Kadam |
| 7,340,638 B2 | 3/2008 | Nicholson et al. |
| 7,450,574 B1 | 11/2008 | Miller et al. |
| 7,624,393 B2 | 11/2009 | Egan et al. |
| 7,793,282 B2 | 9/2010 | Debey |
| 7,849,458 B2 | 12/2010 | Kurzwell |
| 7,924,823 B2 | 4/2011 | Miller et al. |
| 8,010,971 B2 | 8/2011 | Singh |
| 8,151,259 B2 | 4/2012 | Fadell |
| 8,321,858 B1* | 11/2012 | Marmaros ............... G06F 8/65 717/173 |
| 8,509,754 B2 | 8/2013 | Poplett |
| 8,863,192 B2 | 10/2014 | Gao |
| 8,914,786 B2 | 12/2014 | Cooley |
| 9,021,488 B2* | 4/2015 | Kim ............... G06Q 10/06 718/100 |
| 9,513,893 B2* | 12/2016 | Rothrock ............... G06F 8/65 |
| 2002/0152105 A1* | 10/2002 | Dan ............... G06Q 10/06 718/100 |
| 2003/0156632 A1 | 8/2003 | Dowling |
| 2004/0013135 A1 | 1/2004 | Haddad |
| 2004/0098421 A1 | 5/2004 | Peng |
| 2004/0252197 A1 | 12/2004 | Fraley |
| 2005/0068912 A1 | 3/2005 | Scott et al. |
| 2005/0091392 A1 | 4/2005 | Gesswein et al. |
| 2005/0166200 A1 | 7/2005 | Willis, II |
| 2006/0083224 A1 | 4/2006 | Weng et al. |
| 2007/0008893 A1 | 1/2007 | Singh et al. |
| 2007/0074198 A1 | 3/2007 | Gassoway et al. |
| 2007/0118881 A1 | 5/2007 | Mitchell et al. |
| 2007/0206505 A1 | 9/2007 | Forbes et al. |
| 2007/0263825 A1 | 11/2007 | Shah |
| 2008/0049615 A1 | 2/2008 | Bugenhagen |
| 2008/0049746 A1 | 2/2008 | Morrill et al. |
| 2008/0134165 A1 | 6/2008 | Anderson et al. |
| 2009/0028161 A1 | 1/2009 | Fullarton et al. |
| 2009/0222555 A1 | 9/2009 | Qian et al. |
| 2009/0249321 A1 | 10/2009 | Mandyam |
| 2009/0327499 A1 | 12/2009 | Strickland et al. |
| 2010/0045796 A1 | 2/2010 | Fraley |
| 2010/0082559 A1* | 4/2010 | Sumcad ............... G06F 8/65 707/695 |
| 2010/0199078 A1 | 8/2010 | Shih et al. |
| 2010/0274614 A1 | 10/2010 | Fraley |
| 2010/0299433 A1 | 11/2010 | Deboer |
| 2011/0004678 A1 | 1/2011 | Rothrock |
| 2011/0047538 A1 | 2/2011 | Chung et al. |
| 2011/0124325 A1 | 5/2011 | Choi-Grogan |
| 2011/0289499 A1 | 11/2011 | Haubold et al. |
| 2011/0302573 A1 | 12/2011 | Bubolz et al. |
| 2011/0307958 A1* | 12/2011 | Ashton ............... G06F 21/105 726/26 |
| 2012/0079474 A1* | 3/2012 | Gold ............... G06F 8/63 717/173 |
| 2012/0182864 A1 | 7/2012 | Heinz et al. |
| 2012/0210310 A1 | 8/2012 | Cooley |
| 2012/0230328 A1 | 9/2012 | Morrill et al. |
| 2012/0236729 A1 | 9/2012 | Heinz et al. |

OTHER PUBLICATIONS

Mitel 3300 IP Communications Platform, Engineering guidelines Release 8.0, Jul. 2007, 310 pages.

Mitel 3300 IP Communications Platform, Engineering guidelines Release 9.0, Sep. 2008, 310 pages.

PCT International Search Report and Written Opinion, PCT Application No. PCT/US09/31702, dated Mar. 3, 2009, 8 pages.

\* cited by examiner

Steps performed by Upgrade Director 145

700

Steps performed by
Upgrade Director 145

Steps performed by Telephony Devices
310

Steps performed by Telephony Component 310

Figure 9

IMAGE UPGRADE FOR DEVICES IN A TELEPHONY SYSTEM

CROSS REFERENCE TO RELATED APPLICATIONS

This application is a Continuation of U.S. application Ser. No. 14/857,749, filed Sep. 17, 2015 which is a continuation of and claims priority to U.S. application Ser. No. 12/897,573, filed Oct. 4, 2010, titled "Image Upgrade," both which are incorporated by reference in their entirety.

BACKGROUND OF THE INVENTION

1. Field of the Invention

The present invention relates to telephony systems such as those using Voice over Internet Protocol (VoIP). In particular, the present invention relates to upgrading telephony devices.

2. Description of the Background Art

Large Internet Protocol ("IP") based telephony systems involve numerous telephony devices connected across a network. As improvements are made, the software operable on the telephony devices needs to be upgraded (i.e., these telephony devices need an "image upgrade"). Upgrading the image of the various telephony devices that comprise the telephony system is difficult for numerous reasons.

First, upgrading the entire system over skinny Wide Area Network ("WAN") pipes is typically time consuming since the image upgrade typically has a large file size. For example, it can take anywhere between hours to days to fully upgrade a large system due to the file size of the upgrade. Since the upgrade requires a relatively large window of time during which upgrading devices will be nonoperational, the upgrade event needs to be scheduled during business off-hours. However, for systems spanning multiple time zones there is no "off-hours" time window when the telephony devices are not used in which to perform the image upgrade.

Second, extended service outages occur due to the time required to perform the image upgrade. For some customers (e.g., hospitals, utilities, etc.), the phone system is so critical that there is simply no off-hour window that is acceptable. As a result, image upgrades are not feasible and do not occur.

Third, since the upgrade image needs to be transported from its source to the telephony switches using a push or a pull mechanism, upgrading the entire system over a WAN can result in a large volume of network traffic relative to normal network traffic ("network flood"). Network floods can have a snow balling effect causing stability issues that interfere with the update process and the regular operation of the telephone system.

Fourth, power failure during the update process can cause inadvertent partial upgrade of the telephony switches and phones, causing system stability issues.

SUMMARY OF THE INVENTION

The present invention overcomes the deficiencies and shortcomings of the prior art by providing system and method for image upgrade. The system of the present invention is particularly advantageous because it provides a two-step process for upgrading the image of devices in a telephony system that makes upgrading the system image more convenient. At a high level, the two-step process includes: (1) downloading the upgrade image; and (2) rebooting using the upgrade image at a time specified by an administrator. The system also beneficially provides for batched downloading of the upgrade image to one or more target device using delay parameters so that the risk of flooding the network with administrative traffic is minimized. The system comprises an upgrade director and a target device having a manager module. The upgrade director sends a first command to the manager module initiating an upgrade event. The manager module receives the first command. The manager module calculates a delay parameter. The manager module downloads the upgrade image after the delay parameter has ended. Downloading the upgrade image after the delay parameter has ended beneficially provides, among other things, batched downloading of the upgrade image so as to decrease the risk of network flooding. The upgrade director sends a second command to the manager module indicating that the upgrade event is to conclude. For example, a user of the upgrade director is an administrator, and the second command is sent at a time determined by the administrator to be convenient for rebooting the one or more target devices in the telephony system. The manager module receives the second command from the upgrade director and, responsive to the second command, reboots using the upgrade image.

BRIEF DESCRIPTION OF THE DRAWINGS

The accompanying drawings illustrate several embodiments of the invention and, together with the description, serve to explain the principles of the invention. The invention is illustrated by way of example, and not by way of limitation in the figures of the accompanying drawings in which like reference numerals are used to refer to similar elements.

FIG. 9 is a graphical representation illustrating a graphical user interface according to one embodiment of the present invention.

DETAILED DESCRIPTION OF THE PREFERRED EMBODIMENTS

Figure 1:
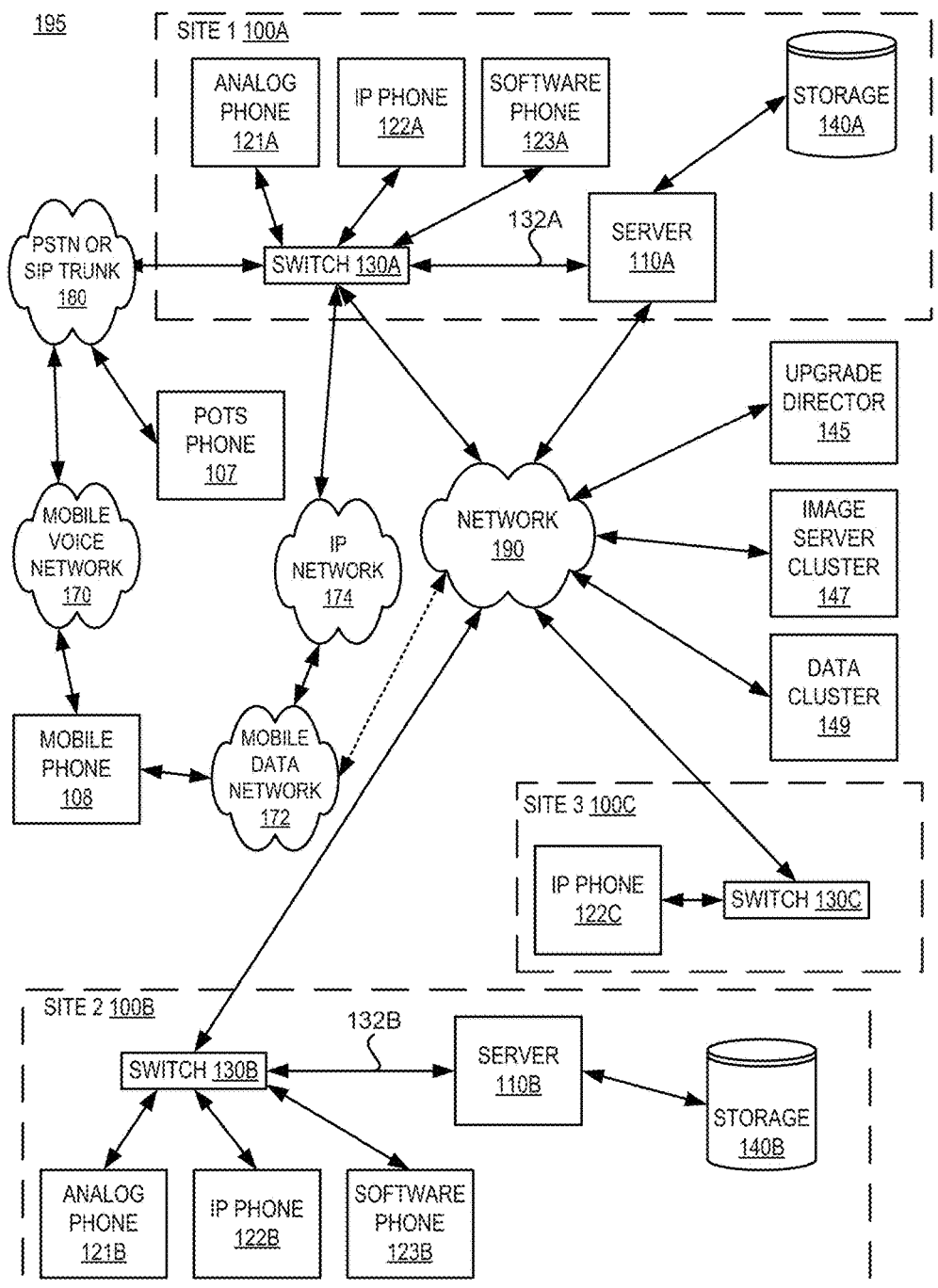
FIG. 1 is a high-level block diagram illustrating a distributed telephony system according to one embodiment of the present invention.

A system and method for image upgrade is described. An image upgrade includes upgrading the software operable on a component of an IP telephony system. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to system operation and particular hardware. However, the present invention applies to any type of computing device that can receive a data and commands, and any peripheral devices providing services.

Although the examples given herein describe the present invention in embodiments applicable to telephony, a person having ordinary skill in the art will recognize that the present invention is applicable to other technologies.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a non-transitory computer-readable memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs and magnetic optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

Enterprises often have several offices or call centers that are located in a plurality of geographically disparate locations, and spanning more than one time zone. These sites include a number of telephony devices that can be upgraded. Upgradable telephony devices include switches, phones, databases, conference bridges, etc. The present invention provides, among other beneficial improvements, a system and method for upgrading the software operable on these telephony devices using a two-step process. Described at a high-level, this two-step process includes: (1) downloading the upgrade image to a target device; and (2) transmitting an activation command to the target device that triggers a reboot using the upgrade image. For example, the upgrade image is downloaded to a memory comprised within the target device so that for a period of time the target device stores both the upgrade image and the old image. The old image is referred to herein as the "active image." The download of the upgrade image can be batched or staggered across multiple devices that are part of the telephony system using device-specific delay parameters so that network bandwidth is optimized, thereby minimizing the risk of network flooding. The download is also optimized so that an available image server nearest to the target device is used for downloading the image upgrade to the target device. For example, the image servers and the target devices are both organized in a hierarchical structure, and the server nearest the target device in the hierarchical structure is used for downloading the upgrade image to the target device.

In one embodiment, the target device continues to operate using the active image for a period of time until the activation command is received. The activation command is sent at a convenient time (e.g., off hours) specified by an administrator. A person having ordinary skill in the art will recognize that sending the activation command at a later time is advantageous for numerous reasons, including, for example, beneficially giving an administrator time to plan the upgrade of the system. Once the activation command is received, the target device begins the process of rebooting the target device using the upgrade image. The target device sends progress reports so that the administrator can monitor the progress of the image download and/or rebooting the target device using a central User Interface ("UI") as described with reference to FIG. 9. In one embodiment, target devices determined to have high processing capability and/or high bandwidth capacity are themselves used as image servers from which other telephony devices can download the upgrade image. A person having ordinary skill in the art will recognize that using target devices having high processing capability and/or high bandwidth capacity beneficially provides additional image servers, and increased scalability for upgrading the system 195, without significantly adding to the financial cost of the upgrade.

FIG. 1 illustrates a block diagram of a distributed telephony system 195, according to one embodiment of the present invention. The illustrated embodiment of telephony system 195 includes a first site 100A, a second site 100B and a third site 100C. As used herein, a site 100 represents a grouping of resources. In the illustrated embodiment, the three sites 100A, 100B, 100C are communicatively coupled via a network 190. One skilled in the art will note that sites 100A, 100B, 100C can be physically distinct from each other or merely topology-related groupings that are not in physically distinct locations. The telephony system 195 in FIG. 1 is used only by way of example. While FIG. 1 illustrates three sites, the present invention applies to any system architecture having one or more sites. Furthermore, while only one network 190 is coupled to the sites 100A, 100B, 100C, in practice any number of networks 190 can be connected to the sites 100A, 100B, 100C.

In one embodiment of the present invention, the network 190 is a partially public or a wholly public network such as the Internet. The network 190 can also be a private network or include one or more distinct or logical private networks (e.g., virtual private networks, Wide Area Networks ("WAN") and/or Local Area Networks ("LAN")). Additionally, the communication links to and from the network 190 can be wireline or wireless (i.e., terrestrial- or satellite-based transceivers). In one embodiment of the present invention, the network 190 is an IP-based wide or metropolitan area network.

The software that supports the computer-integrated functionality of providing the above-described telephony services is generally implemented as a client-server environment in which the participants or clients (distributed telephony users) communicate with a server 110A, 110B. Computer-integrated features rely not only on a server's application platform but also on the availability of the network 190 bandwidth that connects the switches (130A, 130B, 130C), servers (110A, 110B).

In the illustrated embodiment, the switch 130A is coupled to the network 190. The switch 130A is also coupled to the server 110A via signal line 132A and to the Public Switched Telephone Network (PSTN) trunk 180 via an analog or digital trunk line (e.g., a T1 or E1 interface) or a Session Initiation Protocol ("SIP") trunk service provider. In the illustrated configuration, the switch 130A provides an interface for calls originating from or terminating on the PSTN or SIP trunk 180. The PSTN 180 is coupled to any number of Plain Old Telephone phone Service phone (POTS phone) 107, and a mobile voice network 170 coupled to any number of mobile phones represented by mobile phone 108. Thus, POTS phone 107 calls and mobile phone 108 calls can originate on the switch 130A via the PSTN 180. The mobile phone 108 is communicatively coupled to the mobile voice network 170 and a mobile data network 172. The mobile data network 172 is communicatively coupled to an Internet Protocol network 174 ("IP network 174").

The mobile voice network 170 is one or more cellular networks configured to transmit voice packets to different phones via the one or more cellular phone networks. For example, the mobile voice network 170 is one or more cellular telephone networks.

The mobile data network 172 is one or more wireless networks configured to transmit data such to different phones and/or networks. For example, the mobile data network 172 transmits text messages, instant messages, e-mail and data associated with browsing a network such as the Internet. In one embodiment, the mobile data network 172 is a 3G network. In another embodiment, the mobile data network 172 is a 4G network.

The IP network 174 is preferably a wide area network or a similar data network. In another embodiment, the IP network 174 is an IP-based wide or metropolitan area network. The IP network 174 can also be a private network or include one or more distinct or logical private networks (e.g., virtual private networks or wide area networks). In one embodiment, the IP network 174 includes SIP signaling and Wi-Fi or other wireless IP network to the mobile phone. The mobile data network 172 is communicatively coupled to the IP network 174 and the switch 130 is communicatively coupled to the IP network 174. In one embodiment, the communicative couplings to and from the network 174 can be wire line or wireless (i.e., terrestrial- or satellite-based transceivers).

In one embodiment, there is no IP network 174 and the mobile data network 172 is communicatively coupled to the network 190 (either directly or indirectly). For example, the network 190 is a WAN or LAN and the mobile data network 172 is communicatively coupled to the network 190. In another example, the site 100A is a business site and the mobile phone 108 is physically present at the site 100A. The business site has a Wi-Fi network and the mobile phone connects to the network 190 using the Wi-Fi network.

A person having ordinary skill in the art will recognize that there are many ways for the mobile phone 108 to connect to the network 190, and that the examples described above are illustrative, but not limiting, of the scope of the present invention.

Although only a single switch 130A is shown in FIG. 1, those skilled in the art will recognize that a particular site such as the first site 100A may include a plurality of switches 130. The switches 130A, 130B, 130C will be described in more detail below with reference to FIG. 2.

Site 100A

The first site 100A includes a server 110A, a switch 130A, three endpoints (analog phone 121A, IP phone 122A and software phone 123A) and a storage device 140A. The switch 130A represents a Voice over Internet Protocol (VoIP) device to which a number of endpoints can be coupled, such as one or more analog phones 121A, IP phones 122A, and software phones (softphones) 123A.

In one embodiment, the switch 130A is comprised within the server 110A so that the server 110A can provide the functionality of the switch 130A. For example, in one embodiment the sever 110A stores computer code and routines on a memory (not pictured) that is executable by a processor (not pictured) to provide the functionality of the switch 130A (i.e., the sever 110A stores and is configured to execute a softswitch). In another embodiment, electronic circuits are comprised within the server 110A and configured to provide the functionality of the switch 130A. A person having ordinary skill in the art will recognize that there are other ways for configuring the server 110A so that the server 110A provides the functionality of the switch 130A.

An endpoint enables a user to carry on a phone call. Although in the illustrated embodiment the first site 100A has three endpoints (one analog phone 121A, one IP phone 122A and one softphone 123A), in other embodiments the first site 100A has different numbers and types of endpoints. Examples of endpoints include a video conferencing device, a Multipoint Control Unit ("MCU"), a conference bridge, an Analog Terminal Adapter ("ATA"), and any other device that originates and/or terminates a media stream. An endpoint is coupled to the switch 130A, the server 110A or both. Each of the endpoints can also include a display device (not shown) that is used in conjunction with the phone of the endpoint.

Figure 2:
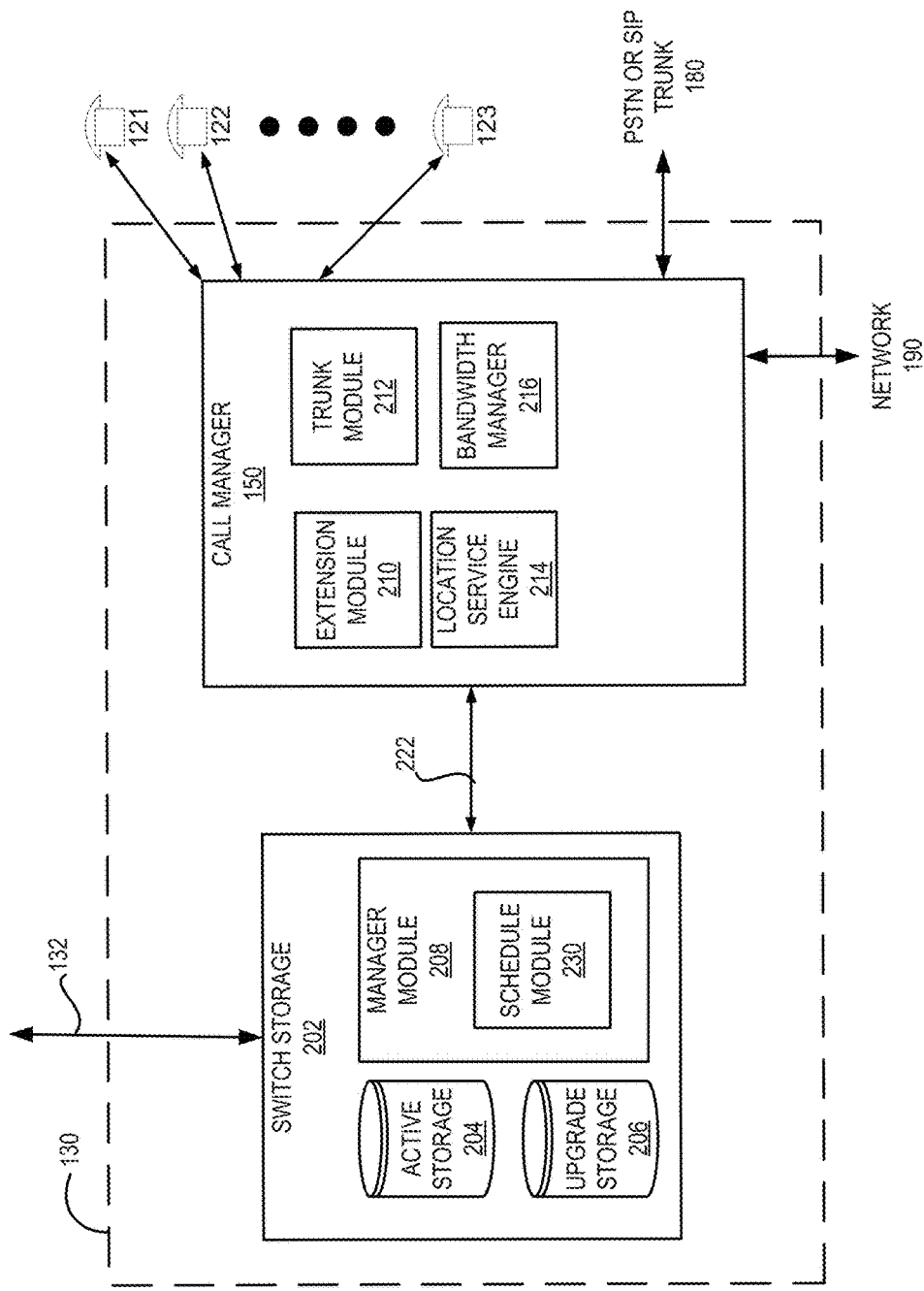
FIG. 2 is a high-level block diagram illustrating a switch according to one embodiment of the present invention.

In one embodiment, an endpoint is a conference bridge adapted to have the functionality of a switch 130A. For example, the conference bridge includes hardware that provides the conference bridge with the functionality of a switch 130A. Such hardware includes, for example, one or more electronic circuit boards, one or more processors and/or a non-transitory storage device (e.g., flash memory, hard drive, etc.) storing data and/or software (e.g., a call manager as depicted in FIG. 2, element 204), and these components are configured to work together with the other components of the conference bridge so that the conference bridge has the functionality of a switch 130A. In another embodiment, the conference bridge has, among other things, a processor and a non-transitory storage device that stores a call manager that, when executed by the processor, causes the conference bridge to have the functionality of a switch 130A. For example, in one embodiment an endpoint is a conference bridge and the bandwidth manager and the settings manager are components of a call manager stored on a storage device that is comprised within the conference bridge.

In one embodiment, an endpoint has a user interface to send data to and receive data from a user. The analog phone 121A has, for example, a Telephone User Interface ("TUI") that sends data through a speaker and receives data through a microphone and a keypad. The IP phone 122A has, for example, both a TUI and a Graphical User Interface ("GUI") that sends data through a display device associated with the IP phone 122A. In one embodiment, the IP phone's graphical user interface also receives data from a touch screen display device associated with the IP phone 122A. The softphone 123A has, for example, a software application that runs on a computer and sends data through a display device and a speaker and receives data through a microphone, a keyboard and a pointing device.

The server 110A is configured to implement features or functions of the telephony system in accordance with the present invention. The server 110A is coupled to the network 190 and, although not shown this way in FIG. 1, can also be coupled to one or more endpoints, such as IP phone 122A and softphone 123A. The server 110A implements a server architecture according to one embodiment of the present invention. The server 110A includes a processor (not pictured). The processor can be a conventional processing device, such as a general-purpose microprocessor. Server 110A also includes a non-transitory computer-readable memory ("the memory" or "a memory"). The memory includes program instructions or functional units that in one embodiment implement features of the present invention. Specifically, in one embodiment the memory includes a Telephony Management Software ("TMS") unit, a Telephony Application Programming Interface ("TAPI") unit and a directory unit. In one embodiment, the memory also includes one or more application units that interact with the TMS unit and the TAPI unit to enable a specific computer-integrated function. An application unit uses the TAPI unit to exchange data with the TMS unit. The TMS unit is able to communicate with and manage one or more switches 130. For example, with reference to FIG. 1, the TMS unit included in the server 110A can manage the switches 130A, 130B, 130C. Through the TAPI unit, the TMS unit presents an application with Computer-Telephony Integration ("CTI") view of these switches 130A, 130B, 130C. This allows the application to manage the switches 130A, 130B, 130C. Such switches 130A, 130B, 130C operate without an associated TMS unit if CTI features are not being used.

The server 110A has a user interface to send data to and receive data from a user. The user interface interacts with TMS in order to allow a user with administrative rights to manage the switches 130A, 130B, 130C and change the configuration settings of the switches 130A, 130B, 130C. The user can access the user interface at the server 110. For example, the server 110 stores and executes a conventional web browser application. The server serves a web page including the user interface. The user accesses the user interface via the web browser. The user changes the configuration settings using the user interface.

In one embodiment the server 110A includes an application unit and/or a directory unit. The application unit assists the switch 130A in providing one or more phones communicatively coupled to the switch 130A with access to conventional PBX applications (e.g., among others, instant messaging, collaboration tools, sidebar conversations between two or more users during ongoing PBX calls, chat sessions between two or more users and/or APIs for integrating third party applications with the standard PBX functions provided by the switch 130A). For example, the application unit is data and routines stored on a non-transitory computer-readable medium comprised within the server 110A. In one embodiment, the server 110A does not include the application unit and the switch can provides PBX functionality without assistance from the switch.

In general, the directory unit enables a phone to access a directory and use the directory in conjunction with other phone functions. In one embodiment, the directory unit is implemented as a service that interacts with TMS unit. Communication or data exchange is between the TMS unit and the directory unit. The directory unit can be distributed among computing devices as is known to one of skill in the art. For example, the functionality enabled by directory unit can be implemented in a client-server fashion by having the client (user's local system, such as a general-purpose computer or endpoint) perform some functions and having the server 110A (directory unit) perform others. As another example, some or all of the functionality enabled by the directory unit can be implemented by having a switch 130A perform some or all functions.

The storage device 140A is a non-transitory computer readable medium that stores, for example, directory information. The directory information includes directory entries and associations between directories and phones. In one embodiment, the storage device 140A also includes information regarding which users have administrative rights to access the server's user interface and make changes to call failure rules that are stored, for example, in one or more switches (e.g., 130A, 130B, 130C) and/or one or more servers (e.g., 110A, 110B). For example, the storage device 140A includes the user name and password of users with administrative rights.

In one embodiment, a user having administrative rights can access the user interface of the server 110A and perform functions such as: (1) initiate commands sent from an upgrade director 145 as described below; (2) view progress reports describing, for example, the progress of the upgrade image download to one or more of the target devices; (3) assign which of the image servers 410 (described with reference to FIG. 4) will provide the upgrade image download for different target devices; and (4) configure one or more of the target devices to function as an image server from which other target devices can download the upgrade image.

A target device is any upgradeable telephony device that is capable of receiving and storing the upgrade image, and then rebooting using the upgrade image (e.g., server 110, IP phone 122, switch 130 and the mobile phone 108 (e.g., the mobile phone 108 is a smart phone)). In one embodiment, the target device comprises, or is communicatively coupled to, a storage device (e.g., flash memory, hard drive, etc) adapted to have dual image storage. Dual image storage is described in further detail with reference to FIG. 2 and FIG. 6 (e.g., storage 204, 206 and storage 602, 604), and upgradeable telephony devices are described in further detail with reference to FIGS. 3 and 6 (e.g., element 310A). In one embodiment, the target device comprises a manager module 208 and a schedule module 230 as described with reference to FIG. 2.

In one embodiment, the target device implements the upgrade image without rebooting the entire target device. For example, the target device stores and executes a shell that boots up an operating system comprised within the target device. The target device further comprises a stored active image and a stored upgrade image. The shell comprised within the target device implements the upgrade image by rebooting the upgrade image using the operating system so that the entire target device does not need to be rebooted to implement the upgrade image. A person having ordinary skill in the art will recognize that the there are other ways of implementing the upgrade image at the target device.

In another embodiment, the mobile phone 108 is the target device and the switch 130A acts as a gateway from which the mobile phone 108 can download or upload the upgrade image via the mobile data network 172 and the IP network 174.

In one embodiment, the storage 140A includes data that is accessed by the switches 130A, 130B, 130C in order to operate. For example, the storage 140A includes data described with reference to FIG. 2 as stored in the switch storage module 202. In the illustrated embodiment, the storage device 140 is directly coupled to the server 110. In an alternate embodiment, the storage device 140 is coupled to the server 110 via the network 190 (or via a LAN communicatively coupled to the site 100A). Although the storage device 140A is depicted in FIG. 1 as being at the same site 100A as the other telephony devices, in one embodiment the storage device 140A is located at a different geographic location and the server 110A is communicatively coupled to the storage device 140A and adapted to communicate with the storage device 140A via the network 190.

One skilled in the art will appreciate that additional networking devices (not shown) can be added to the first site 100A, for example, if needed to support additional endpoints, servers 110A, switches 130A or other systems. For example, the first site 100A can include a second switch 130 and an edge router to couple the first site 100A to the network 190 and to provide local area connectivity for the first and second switches 130. One skilled in the art will also recognize that numerous configurations of switches 130 and communication links are contemplated. For example, PSTN links can be coupled to multiple switches 130 at several points within the topology and soft-switches 130 can also be used.

As shown in FIG. 1, the upgrade director 145 is communicatively coupled to the network 190. At a high level, the upgrade director: (1) communicates with the image server cluster 147 to set up servers (element 410 in FIG. 4) to download the upgrade image; and (2) transmits commands to the target devices so that the upgrade director 145 manages the process of upgrading the target devices to the upgrade image. A person having ordinary skill in the art will recognize that the upgrade of a target device can be a push or a pull operation. For example, in a push operation the server (element 410 in FIG. 4) downloads the upgrade image to the target device whereas in a pull operation the target device downloads the upgrade image from the server (element 410 in FIG. 4). The upgrade director 145 has additional functionality as described below with reference to FIG. 3. In one embodiment, the upgrade director 145 is a hardware device having a processor, a non-transitory computer readable memory and a network interface for communicating with the network 190. For example, the upgrade director 145 is a server similar to server 110 that stores computer-readable code comprising instructions for performing the functionality of the upgrade director 145.

The image server cluster 147 is one or more image servers 410 (see also FIG. 4) similar to server 110 that host the upgrade image. An image server 410 is communicatively coupled to the network 190, and includes, among other things, a processor, a tangible non-transitory computer readable memory and a communication interface for communicating with the network 190. As described in further detail below, one or more target devices access the image server 410 and download the upgrade image. In one embodiment, the image servers 410 are located at geographically disparate locations relative to one another. The image server cluster 147 is discussed in further detail with reference to FIG. 4.

The data cluster 149 is a cluster of databases 502, 504 (see also FIG. 5) stored on storage devices similar to the storage device 140. The databases 502, 504 are each communicatively coupled to the network 190. The databases 502, 504 store the upgrade image and the active image, and work with the image servers 410 to download the upgrade image to the upgradeable telephony devices responsive to commands received from the upgrade director 145. In one embodiment, the databases 502, 504 are located at geographically disparate locations relative to one another. The data cluster 149 is discussed in further detail with reference FIG. 5.

Referring now back to FIG. 1, the second site 100B includes: endpoints (analog phone 121B, IP phone 122B, software phone 123B); a switch 130B; a server 110B; and a storage device 140B. The third site 100C includes IP phone 122C and a switch 130C. The elements of the second site 100B and the third site 100C work similar to the elements of the first site 100A described above, and so, that description will not be repeated here. Similar elements have similar reference numerals.

The third site 100C comprises an IP phone 122C and a switch 130C. These components are similar to those described above with reference to the first site 100A and the second site 130B, so that description will not be repeated here.

A person having ordinary skill in the art will recognize that in one embodiment, the system 195 includes one or more third party servers (not shown) similar to server 110 that provide third-party applications to the endpoints (analog phone 121, IP phone 122, software phone 123) via the network 190 and the switch 130.

Switch 130

Referring now to FIG. 2, an embodiment of the switch 130 according to one embodiment of the present invention is shown. The depicted switch 130 is similar to switches 130A, 130B and 130C described above for FIG. 1. In this embodiment, switch 130 is configured to implement features or functions of the present invention. In one embodiment, the switch 130 includes one or more processors (not shown).

The processor can be a conventional processing device, such as a general-purpose microprocessor. In a different embodiment, the switch 130 does not include a processor but is instead controlled by a processor comprised within a server 110 at the same site 100 and/or a server 110 at a different site 100. Switch 130 also includes a non-transitory computer readable memory. The memory stores, among other things, software and routines (not shown) conventionally used to operate a switch 130 in a VoIP telephony system 195. For example, the switch 130 includes software routines for performing call monitoring, transferring calls, placing calls on hold, establishing hunt groups, automated attendant functions, etc. The memory also stores program instructions or functional units that implement the features of the present invention. The switch 130 also includes a switch storage module 202 and a call manager 150.

The switch storage module 202 is a memory for storing data and information. For example, the switch storage module 202 stores data and information utilized by the call manager 150 to perform its functions. In one embodiment, the switch storage module 202 is a tangible, non-transitory computer readable memory (e.g., flash memory). The switch storage module 202 is communicatively coupled to the call manager 150 via signal line 222. In one embodiment, the switch storage module 202 is a portion of the memory of the switch 130.

In the depicted embodiment, the switch storage module 202 comprises: an active storage 204; an upgrade storage 206; and a manager module 208. The active storage 204 is a portion of the switch storage 202 that stores the active image utilized by the switch 130 to perform its functions. The upgrade storage 206 is a portion of the switch storage 202 that stores the upgrade image that is downloaded from the image server. The switch 130 downloads the upgrade image from the image server 410 (see FIG. 4) and stores the upgrade image in the upgrade image storage 206.

The manager module 208 is codes and routines, stored on the switch storage module 202, and executable by the processor comprised within the switch 130 to cause the processor to schedule an upgrade event with the upgrade director 145, receive commands from the upgrade director 145 and initiate processes responsive to the commands received from the upgrade director 145. The manager module 208 comprises a schedule module 230 for determining a delay parameter. The manager module 208 and the schedule module 230 are comprised within the upgradeable telephony device. In FIG. 2, the upgradeable telephony device is the switch 130. A person having ordinary skill in the art will recognize how the teachings of FIG. 2 can be applied to other telephony devices.

In one embodiment, the schedule module 230 is a sub-module of the manager module 208. In another embodiment, the manager module 208 is a component of switch storage 202 and schedule module 230 is comprised within the manager module 208. In one embodiment, the schedule module 230: (1) determines a delay parameter, (2) receives a "prepare to upgrade command" from the upgrade director 145 and then (3) waits a period of time specified by the delay parameter before causing the manager module 208 to begin downloading the upgrade image from the image server 410 described below with reference to FIG. 4. In one embodiment, the manager module 208 stores the determined delay parameter in a non-transitory memory communicatively coupled to the manager module 208 (e.g., switch storage 202).

The schedule module 230 communicates with the image servers 410 and/or one or more of the target devices to determine one or more delay parameters that specify the timing of an upgrade event for one or more of the devices 310. In one embodiment, the schedule module 230 schedules the upgrade events so as to minimize the impact on the network 190, thereby reducing or preventing network flooding. The schedule module 230 uses the delay parameter to schedule a download window for its upgrade image so that the possibility of a collision of its download window with that of another target device is minimized.

In one embodiment, the schedule module 230 calculates the delay parameter as a random number using, for example, a random number generator. For example, the system 195 is being upgraded and the length of the downtime allotted for upgraded the system is some predetermined amount of time, e.g., 20,000 seconds. The schedule module 230 comprises a random number generator that is adapted to generate random number of a certain digit length, e.g., a five digit random number. The random number generator is allowed to output one or more random numbers until the generator outputs a number less than the length of downtime, e.g., 15,595. The schedule module 230 determines the delay parameter to be the number generated by the random number generator, e.g., 15,595 seconds.

In another embodiment, each target device has a unique identifier and the schedule module 230 uses the unique identifier to determine a delay parameter for the target device according to a unique identifier equation. The unique identifier equation is "delay parameter=(Window ID)*(Time Available for Download)". The "Time Available for Download" is calculated as "Time Available for Download=(Time for System Upgrade)/(total number of target devices))." For example, if there are two hours in which to perform a system 195 upgrade, and there are 100 target devices that must be upgraded, each target device gets a download window of approximately 72 seconds in which to download the upgrade image [i.e., ((2 hours*(3600 seconds/1 hour))/100 devices) =72 seconds per device]. Thus, in this example, "Time Available for Download"=72 seconds per device. The "Window ID" is calculated by the equation "Window ID=(target unique identifier)MODULUS(total number of target devices)." The modulus operator that returns the remainder in the integer division. For example, if the unique identifier is the number "9" and the total number of devices is 100, then the Window ID is 9 [i.e., Window ID=(9)MODULUS (100 devices)=9] Thus, in this example, the "Window ID" is 9. If there are 200 devices, then the Window ID is also 9 [i.e., Window ID=(9)MODULUS(200 devices)=9]. Similarly, if there are 250 devices, then the Window ID is 9 [i.e., Window ID=(9)MODULUS(250 devices)=9]. In another example, the target unique identifier is 109 and there are 100 devices, so that the Window ID is 9 [i.e., Window ID=(109)MODU-LUS(100)=9]. A person having ordinary skill in the art will recognize that, in the above described example, the equation for calculating Window ID is a modulus equation that returns the remainder of dividing two integers.

Using the above examples, the delay period for the target device having the unique identifier of 9 is 648 seconds [i.e., delay parameter=(9)*(72 seconds)=648 seconds]. In other words, the target device will not begin to download the image upgrade until 648 seconds after receiving the command to begin the download (e.g., a prepare to upgrade command). Accordingly, the Windows ID spreads out the devices into different download windows so that the network 190 is not likely to experience network flood as described above due to too many devices downloading the upgrade image during the same or an overlapping time period.

In one embodiment, the schedule module 230 determines one or more delay parameters by determining (1) a number of upgrade events that will occur when upgrading the telephony system 195, (2) the bandwidth usage for one or more upgrade events, (3) other event occurring on the network cotemporaneous to the upgrade event and (4) timing for the one or more upgrade events so that impact on the network 190 caused by the upgrade events is reduced to an acceptable level (i.e., the network 190 still has adequate bandwidth to perform other operations, or the network 190 has adequate bandwidth to perform the upgrade events in an acceptable time frame). The result of this determination is a delay parameter.

In another embodiment, the schedule module 230 is comprised within the upgrade director 145 (see FIG. 3) and the manager module 208 receives signals from the upgrade director 145 including data indicating a time at which the switch 130 should begin download of the upgrade image from an image server. The time can be a specific time (e.g., Jan. 1, 2011, 2:00 am, Coordinated Universal Time ("UTC")) or a range of times (e.g., from Dec. 25, 2010, 2:00 am, UTC to Jan. 1, 2011, 4:00 am, UTC) for the switch 130 to begin the download of the upgrade image. The manager module 208 stores this information in the switch storage 202 and then, at the time specified by the schedule module 230 comprised within the upgrade director 145, begins the download of the upgrade image.

In one embodiment, the upgrade occurs without calculation of a delay parameter. For example, a first manager module 208-1 is comprised within a first target device and a second manager module 208-2 is comprised within a second target device. The first manager module 208-1 issues a command to the second manager module 208-2 to start the download after the first target device is completed downloading the upgrade image. Accordingly, in one embodiment the upgrade occurs for the second device without need to calculate the delay parameter.

In one embodiment, the schedule module 230 determines the delay parameter so that two or more target devices share a common window of time for downloading the upgrade image, but the number of target devices that share the same download window is optimized so that the network 190 does not experience a network flood event as described above.

The manager module 208 receives signals from the upgrade director 145 including data indicating which image server 410 the switch 130 should download the upgrade from. This is referred to herein as "setting up the image servers 410." The process of setting up the image servers 410 is discussed in more detail with reference to the image server module 320 described below for FIG. 3. The manager module 208 stores this data in the switch storage 202 and then causes the switch 130 to download the upgrade image from the specified image server 410 at a time consistent with the delay parameter.

The switch storage 202 is coupled by a signal line 132 to the server 110. The server 110 uses the signal line 132 to download information to the switch storage module 202. The information downloaded by the server 110 includes the information noted above to allow the call manager 150 to perform its functions. In one embodiment, the server 110 downloads to the switch 130 the upgrade image and the various commands relating to the upgrade process.

A device, such as the processor of the switch 130, runs the call manager 150 software application and is coupled to and controls one or more endpoints (e.g., 121, 122 and 123) with which it is associated. While shown as operational and as part of the switch 130 in FIG. 2, those skilled in the art will recognize that in other embodiments, the call manager 150 may be operational as a separate module in a site 100A or as part of a server 110A.

Although in the illustrated embodiment each site 100 has only one call manager 150 comprised within the switch 130, in other embodiments the site 100 has a different number of call managers 150. Also, more than one call manager 150 can control the same endpoint. The association between a call manager 150 and an endpoint that it controls is accessed through the server 110. Furthermore, although not shown, the second switch 130 includes its own call manager 150.

In one embodiment, the trunk 180 is a SIP trunk and provides connectivity to SIP-compatible devices. One having ordinary skill in the art will recognize that network 190 also provides connectivity for SIP-compatible devices.

As shown in FIG. 2, the call manager 150 is coupled to the PSTN or SIP trunk 180 and the network 190. The call manager 150 comprises: an extension module 210; a trunk module 212; a location service engine 214; and a bandwidth manager 216. In one embodiment, the manager module 208 described above is a module comprised within the call manager 150.

The extension module 210 communicates with endpoints coupled to the call manager 150 in order to allow a user to perform call-related functions on an endpoint. In addition, the extension module 210 is used to communicate with other call managers 150 in the telephony system 195.

The trunk module 212 is coupled to and controls the interaction between the endpoints 121, 122 and 123 and the PSTN or SIP trunk 180. In particular, the call manager 150/switch 130 is often coupled to a trunk line. The trunk module 212 of the call manager 150 manages the usage of the trunk line by multiple endpoints 121, 122 and 123 and optimizes the usage of the trunk line. The trunk module 212 also manages trunk services such as caller identification, direct inward dial, etc.

The location service engine 214 resolves the dialed numbers (converts raw dialed digits into routable contacts) and routes the call to the destination endpoint such a phone, trunk, hunt group, auto attendant, pickup group etc.

The bandwidth manager 216 is coupled to the network 190 and allocates bandwidth necessary to support calls handled by the call manager 150.

In one embodiment, one or more of the above described components of the call manager (i.e., the extension module 210, trunk module 212, location service engine 214, bandwidth manager 216) are codes and routines stored on a memory comprised within the switch 130 and executable by the switch's processor to provide the functionality described above.

In another embodiment, one or more of the above described components of the call manager 150 are a specialized hardware devices configured to perform the function of the particular components. For example, one or more of the manager module 208, schedule module 230, extension module 210, trunk module 212, location service engine 214 and bandwidth manager 216 is a combination of one or more electronic circuit boards configured to provide the above-described functionality for that component. In one embodiment, the one or more electronic circuit boards that comprises the component includes one or more of: (1) a processor; (2) a non-transitory computer-readable memory (e.g., flash memory, a hard-drive, a buffer, a circular buffer, etc.) communicatively coupled to the processor; and (3) processor-executable firmware stored on the non-transitory memory.

Upgrade Director 145

Figure 3:
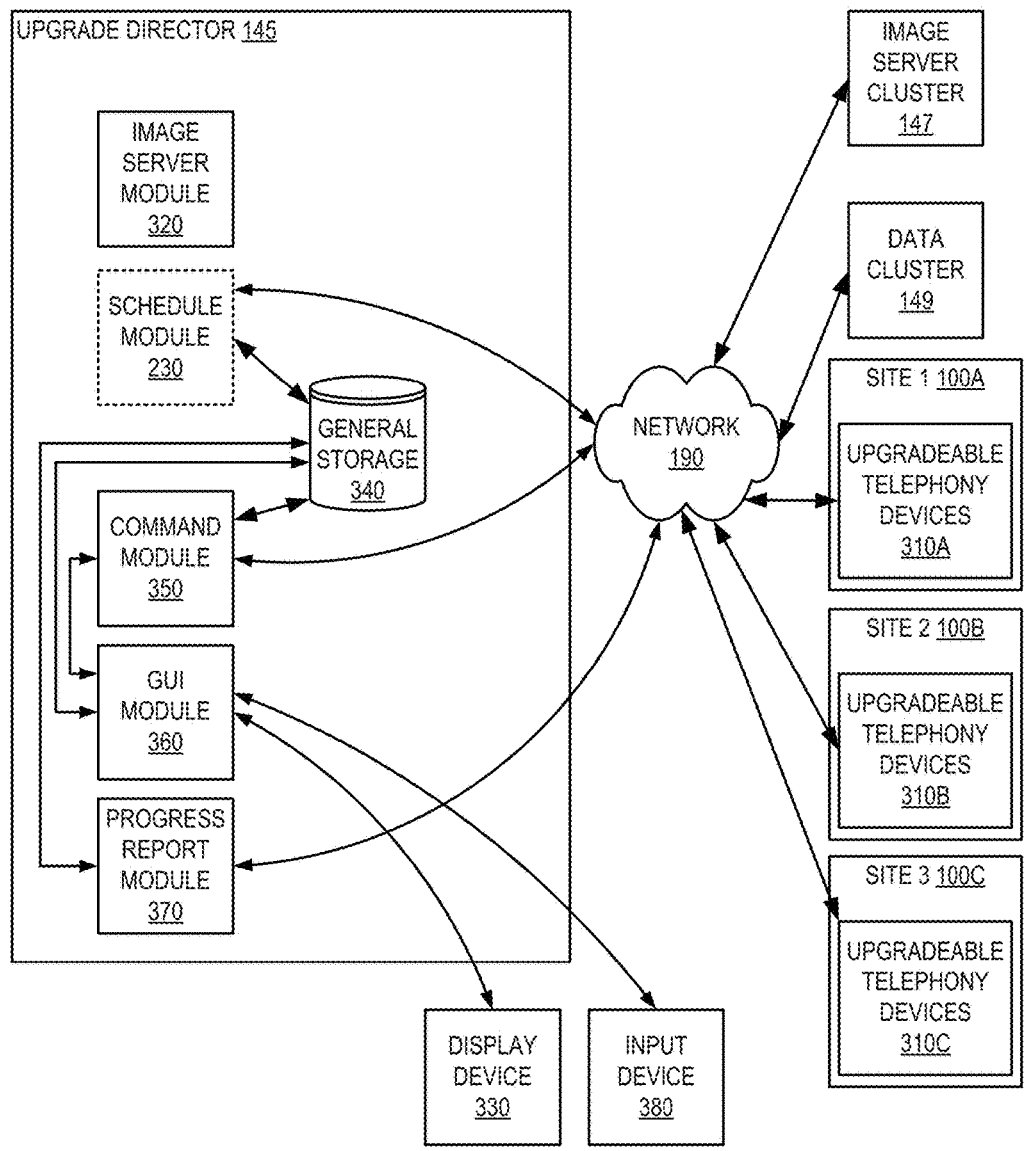
FIG. 3 is a block diagram illustrating an upgrade director according to one embodiment of the present invention.

FIG. 3 shows the upgrade director 145 communicatively coupled to the network 190, the image server cluster 147, the data cluster 149 and the upgradeable telephony devices 310A, 310B, 310C of sites 100A, 100B, 100C, respectively. The image server cluster 147 is described in further detail with reference to FIG. 4 and the data cluster 149 is described in further detail with reference to FIG. 5.

The sites 100A, 100B and 100C are described above for FIG. 1. Here, in addition to the components shown in FIG. 1, the sites 100A, 100B and 100C are shown as comprising upgradeable telephony devices 310A, 310B, 310C, respectively. The upgradeable telephony components 310 comprise telephony components adapted to (1) download an upgrade image from one of the servers 410 comprising the image server cluster 147, (2) store the upgrade image and (3) reboot using the downloaded upgrade image. For example, the upgradeable telephony devices 310A, 310B and 310C include one or more of the server 110, IP phone 122, the software phone 123, the switch 130 and the storage device 140. A person having ordinary skill in the art will recognize that other upgradeable telephony devices 310 are possible.

The upgrade director 145 comprises: an image server module 320; a command module 350; a graphical user interface module 360 ("GUI module 360"); and a progress report module 370. In one embodiment, the upgrade director 145 also includes a schedule module 230 as described above with reference to FIG. 2. The schedule module 230 is depicted with dashed lines to indicate that it is an optional feature of the upgrade director 145.

The image server module 320 communicates with the image server cluster 147 to set up the image servers 410 for an upgrade event for one or more of the upgradeable telephony devices 310A, 310B, 310C. An upgrade event is the process of one or more target devices downloading an upgrade image and then, at a later time, rebooting using the upgrade image. The upgradeable telephony devices 310 are telephony devices within the system 195 that have the necessary hardware to enable them to download the upgrade image. One or more of the upgradeable telephony devices 310 receives an "initiate upgrade" command from the upgrade director 145. The initiate upgrade command indicates which of the upgradeable telephony devices 310 will be downloading the upgrade image. The upgradeable telephony devices 310 that receive the initiate upgrade command from the upgrade director 145 are referred to as target devices. In one embodiment, less than all the upgradeable telephony devices 310 in the system 195 receive an initiate upgrade command.

The image server module 320 is communicatively coupled to the network 190. In one embodiment, the image server module 320 determines which of the image servers 410 a particular target device (e.g., a switch 130A) should communicate with when downloading the upgrade image. For example, the target devices and the image servers 410 are organized into a tree-based hierarchy, and the image server module 320: (1) determines a proximity of a target device relative to one or more of the image servers 410; (2) determines which of the image servers 410 is has the nearest proximity to the target device in the hierarchy; and (3) sends a message to the target device indicating which image server 410 that target device should access when downloading the upgrade image so that the target devices accesses the image server 410 having the nearest proximity to that target device.

In one embodiment, the image server module 320 sends a message to each target device (e.g., the switch 130) with instructions specifying which image server 410 the target device should communicate with for downloading the upgrade image. The target device then stores the message and downloads the upgrade image accordingly after receiving a command from the upgrade director 145 to begin the download.

In one embodiment, the image server module 320 determines from the upgradeable telephony devices 310 that is suitable for use as an image server 410 and then configures that device to function as an image server 410. For example, the image server module 320 determines which device 310 has a predetermined processing power and/or predetermined bandwidth and then configures that server to function as the image server 410. A copy of the upgrade image is downloaded to the device and so that the device can download the upgrade image to target devices.

The display device 330 is a conventional display device (e.g., a computer monitor, a display on a phone, etc). The input device 380 is a conventional input peripheral (e.g., a keyboard, a mouse, etc.). The display device 330 and the input device 380 are communicatively coupled to the GUI module 360. In one embodiment, the display device 330 and the input device 380 are communicatively coupled to a processor-based device such as a personal computer. In another embodiment, the display device 330 and the input device 380 are components of a processor-based smart device (e.g., a smart phone, an IP phone 122, etc.) or a processor-based tablet device (e.g., a tablet computer). In one embodiment, the display device 330 is a touch sensitive display and the input device 380 is hardware comprised within the display device 330.

The command module 350 sends commands to the target devices and the image servers 410. In one embodiment, the command module 350 is communicatively coupled to the target devices (via network 190), the graphical user interface module 360 and the general storage 340. The graphical user interface module 360 receives a signal from a user of the input device 380 and passes the signal to the command module 350. The command module 350 communicates the command specified by the signal to one or more of the target devices. Examples of commands communicated by the command module 350 to the target devices include one or more of a "prepare to upgrade command," an "upgrade command" and a "rollback command." For example, a prepare to upgrade command causes a target device to calculate the delay parameter and then download the upgrade image responsive to the delay parameter. The upgrade command causes the target device to implement the downloaded upgrade image (e.g., reboot using the upgrade image). The rollback command causes the target devices initiate a rollback event. A person having ordinary skill in the art will recognize that other commands are possible.

A rollback event is an event whereby a target device that has already rebooted to an upgrade image reverts from the upgrade image to the active image (i.e., the image previously used by the target device and stored in the active storage, referred to above as the "old image"). In one embodiment, the GUI module 360 receives an input from a user of the input device 380 indicating that a rollback event is to occur. The GUI module 360 signals to the command module 350 that a rollback event is to occur. The command module 350 sends a rollback command to one or more target devices and the target devices begin the rollback event responsive to receiving the rollback command. For example, the target device stores both the upgrade image and the active image, and the target device reboots using the active image instead of the upgrade image. In one embodiment, the target device deletes the upgrade image responsive to receiving the rollback command.

The GUI module 360 is adapted to expose a graphical user interface on the display device 330. The GUI module 360 module is communicatively coupled to the general storage 340, the display device 330 and the input device 380. The general storage 340 stores GUI data that is retrieved by the GUI module 360 and used by the GUI module 360 to generate and expose a GUI on the display device 330. Examples of GUIs are discussed with reference to FIG. 9.

The user of the display device 330 provides an input using the input device 380 responsive to a GUI exposed on the display device 330 (e.g., a mouse input indicating that prepare to upgrade command should be sent). The GUI module 360 passes this input as a signal to the command module 360 and the command module 360 which in turn sends a command to a target device responsive to the input.

The progress report module 370 tracks the progress of the upgrade event and stores progress data describing the progress in the general storage device 340. The GUI module 360 retrieves the progress data. The GUI module 360 generates graphics responsive to the progress data and causes the graphics to be displayed on the display device 330. For example, the graphic is a graph showing one or more of: (1) a percentage of the upgrade devices that have downloaded the upgrade image; (2) a percentage of the upgrade devices that have downloaded the upgrade image and rebooted using the upgrade image; (3) a percentage of the upgrade devices that have began the download of the upgrade image; and (4) for one or more upgrade devices, a percentage of the upgrade image that has been downloaded to the one or more upgrade devices. In one embodiment, the progress report is generated using progress data received from the target device. The progress reports are stored by the progress report module 360 in the general storage 340 as progress data. In one embodiment, the progress data includes codes and routines executable by a processor for causing a progress report graphic to be displayed on the display device 330.

In one embodiment, the upgrade director 145 comprises a schedule module 230 as described above for FIG. 2 and the schedule module 230 determines a delay parameter for each target device. The schedule module 230 is communicatively coupled to one or more target devices and transmits the delay parameters to the target devices. The schedule module 230 is depicted with a hash line in FIG. 3 because it is an optional feature of the upgrade director 145.

In one embodiment, the above-described modules (e.g., the manager module 208, the schedule module 230, the image server module 320, the command module 350, the GUI module 360 and the progress report module 370) are processor-executable codes and routines stored on one or more non-transitory computer readable mediums (e.g., flash memory, hard drive, switch storage 202, general storage 340) that, when executed by a processor, provide the functionality described above with respect to each module. For example, the modules are processor-executable code stored on a computer-readable medium that, when executed by a processor (e.g., a processor comprised within an upgradeable telephony device 310, upgrade director 145 or personal computer), performs steps that provide the above-described functionality. In another embodiment, the above-described modules are hardware components configured to provide the functionality described above with respect to each module. For example, the modules are specially configured circuit boards that provide the above-described functionality.

Image Server Cluster 147

Figure 4:
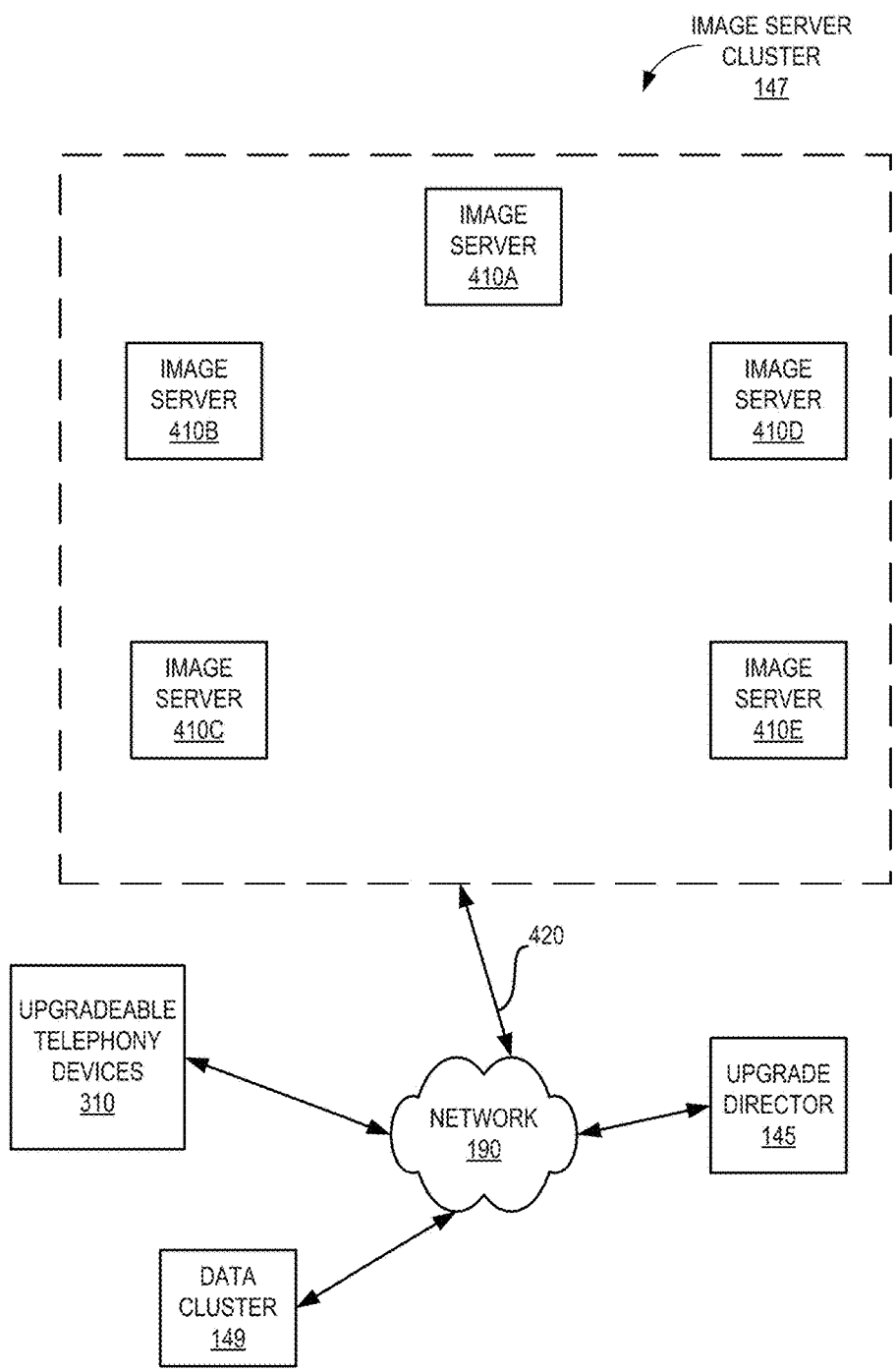
FIG. 4 is a block diagram illustrating an image server cluster according to one embodiment of the present invention.

FIG. 4 depicts an embodiment of the image server cluster 147 coupled to the upgradeable telephony components 310, the data cluster 149 and the upgrade director 145 via the network 190. The individual image servers 410 are communicatively coupled to the network 190 via one or more signal lines 420. The image servers 410A-410E are configured for communication with each other via a network (not shown) similar to network 190.

The image server cluster 147 comprises one or more image servers 410A, 410B, 410C, 410D, 410E. In the depicted embodiment, the image server cluster 147 comprises five image servers 410A-410E. In another embodiment, the image server cluster 147 comprises a different number of image servers 410A-410E. In one embodiment, the different image servers 410A-410E that comprise the image server cluster 147 are located at different geographic locations and/or sites 100A, 100B, 100C.

The upgrade image servers 410 are conventional servers that host the upgrade image for the different upgradeable telephony devices 310. The image servers 410 download the upgrade image to the upgrade storage devices 504 that comprise the data cluster 149 (see FIG. 5). The image servers 410 downloading the upgrade image to the target devices is described in further detail with reference to FIG. 5.

In one embodiment, the image servers 410A-410E are organized into a hierarchical structure that includes the upgradeable telephony components 310, so that the image server module 320 can determine proximity between a target device and an image server 410A-410E and the target devices can download their upgrade image from an image server 410A-410E that is closest in proximity within the image server 410 hierarchy. For example, the upgradeable telephony devices at the sites 100A, 100B, 100C and the image servers 410A-410E are organized into a tree-based hierarchy. One of the sites 100A, 100B, 100C is a parent site (i.e., root site) that has any number of child sites (e.g., any number of the sites 100A, 100B, 100C that are not the parent site), thereby forming a hierarchy. Any number of the sites 100A, 100B, 100C has zero or more image servers 410 and/or zero or more upgradeable telephony devices. The image server module 320 determines the proximity of a first image server 410 relative to a target device by counting the number of steps between the first image server 410 and the target device. The image server module 320 determines that the nearest proximity image server 410 for a target device is the image server 410 that is the fewest steps away from the target device. If the first image server 410 is at the same site 100A, 100B, 100C as the target device, then the first image server 410 is determined by the image server module 320 to be the nearest proximity image server 410. If the image server module 320 determines that there is no imager server 410 at the same site 100A, 100B, 100C as the target device, then the imager server module 320 analyzes the hierarchy and determines that the nearest proximity imager server 410 is the image server 410 that is the fewest steps away from the target device. A person having ordinary skill in the art will recognize that other methods for determining proximity are possible without deviating from this embodiment of the present invention.

In one embodiment, the GUI module 360 exposes a GUI on the display device 330 that enables the user of the display device 330 to provide input using input device 380 that modifies the organization of the image servers 410 that comprise image cluster 147.

In one embodiment, the image servers 410A-410E are File Transfer Protocol servers ("FTP servers") and the image is pulled down by the target device using file transfer protocol. For example, the image server 410A is an FTP server and the mobile phone 108 is the target device. Persons having skill in the art will recognize how the mobile phone 108 pulls down the upgrade image from the image server 410 via the mobile data network 172 and the IP network 174 using the switch 130A as a gateway to communicate with the image server 410. In another example, the switch 130A does not act as a gateway, there is no IP network 174 and the mobile data network 172 is communicatively coupled to the network 190. In this example the mobile phone 108 pulls down the upgrade image in a manner known to those having skill in the art.

In another embodiment, the image servers 410A-410E run a handshake routine in which the target device handshakes with and an image server 410A-410E, determines a request to download the upgrade image and then pushes the upgrade image to the target device included in the handshake. For example, the image server 410B handshakes with the IP phone 122A. The IP phone 122A is the target device and the image server 410B is the image server. The image server 410B interprets the handshake as a request to download the upgrade image. The image server 410B pushes the upgrade image to the IP phone 122A via the network 190.

Data Cluster 149

Figure 5:
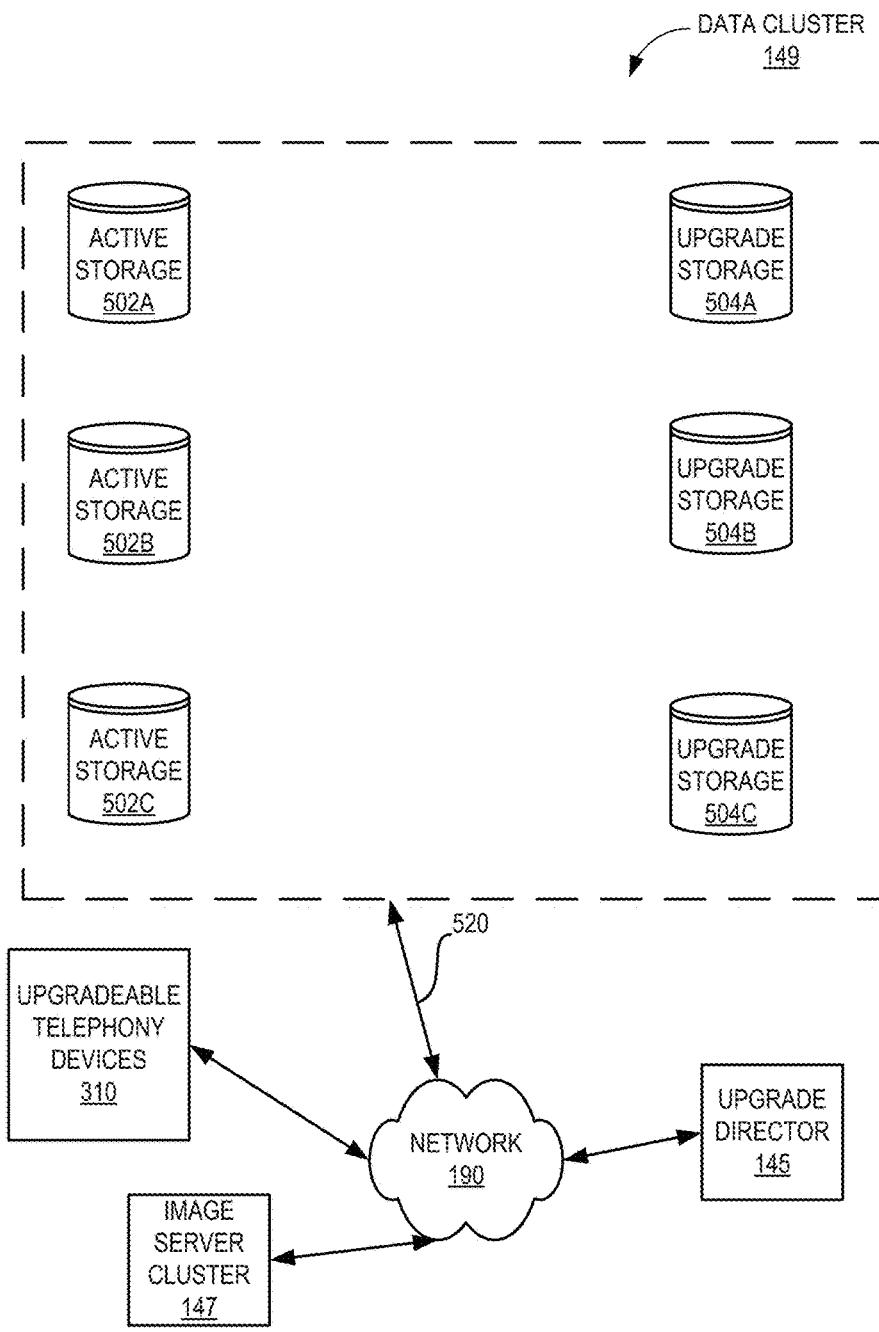
FIG. 5 is a block diagram illustrating a data cluster according to one embodiment of the present invention.

FIG. 5 depicts an embodiment of the data cluster 149 communicatively coupled to the upgradeable telephony components 310, the image server cluster 147 and the upgrade director 145 via the network 190. The data cluster 149 comprises one or more active storage modules 502 and one or more upgrade storage modules 504. The active storage modules 502A, 502B, 502C are portions of one or more storage devices similar to storage device 140 that store configuration and call record data used by the active image of the upgradeable telephony components 310. The data stored in the active storage modules 502A-502C is referred to as the active image data. The upgrade storage modules 502A-502C are portions of one or more storage devices similar to storage device 140 that store upgraded versions of the active image data that are consistent with the upgrade image. In one embodiment, the active image data is consistent with the upgrade image because the data schema and the data representation of the active image data and the upgrade image do not vary. For example, the active data stored within the active storage 502A, 502B, 502C is ported to the new schema of the data stored in the upgrade storage 504A, 504B, 504C. In another embodiment, In another embodiment, the upgrade storage 504A, 504B, 504C stores a copy of the active image data stored in the active storage 502A, 502B, 502C and the active image data stored in the upgrade storage 504A, 504B, 504C is used as the image data for the system after the upgrade event is concluded so that the upgraded target devices function correctly and settings that were effective prior to the upgrade event are preserved.

The data stored in the upgrade storage modules 502A-502C is referred to as the upgrade image data. In one embodiment, the upgrade image data is in sync with the active image data until the upgrade image is activated (i.e., until the target devices reboot using the upgrade image). For example, the active data stored within the active storage 502A, 502B, 502C is ported to the new schema of the data stored in the upgrade storage 502A, 502B, 502C and when the active data is changed or modified the upgrade data is changed or modified so that the upgrade data is equivalent to the active data. In another example, active image data stored in the upgrade storage 504A, 504B, 504C is used as the upgrade image data following the upgrade event as described above, and so, the upgrade image data is in sync with the active image data in this way.

In the depicted embodiment, the data cluster 149 comprises three active storage modules 502A, 502B, 502C and three upgrade storage modules 504A, 504B, 504C. In another embodiment, different numbers of active storage modules 502 and upgrade storage modules 504 are comprised within the data cluster 149. The individual active storage modules 502 and the individual upgrade storage modules 504 are communicatively coupled to the network 190 via one or more signal lines 520. In one embodiment, the active storage modules 502 and upgrade storage modules 504 are located at different geographic locations.

In one embodiment, the different active storage modules 502 and upgrade storage modules 504 are conventional non-transitory computer readable storage devices (e.g., flash memory, hard drives or databases) that are communicatively coupled to transmit data to the upgradeable telephony devices 310.

Upgradeable Telephony Devices 310

Figure 6:
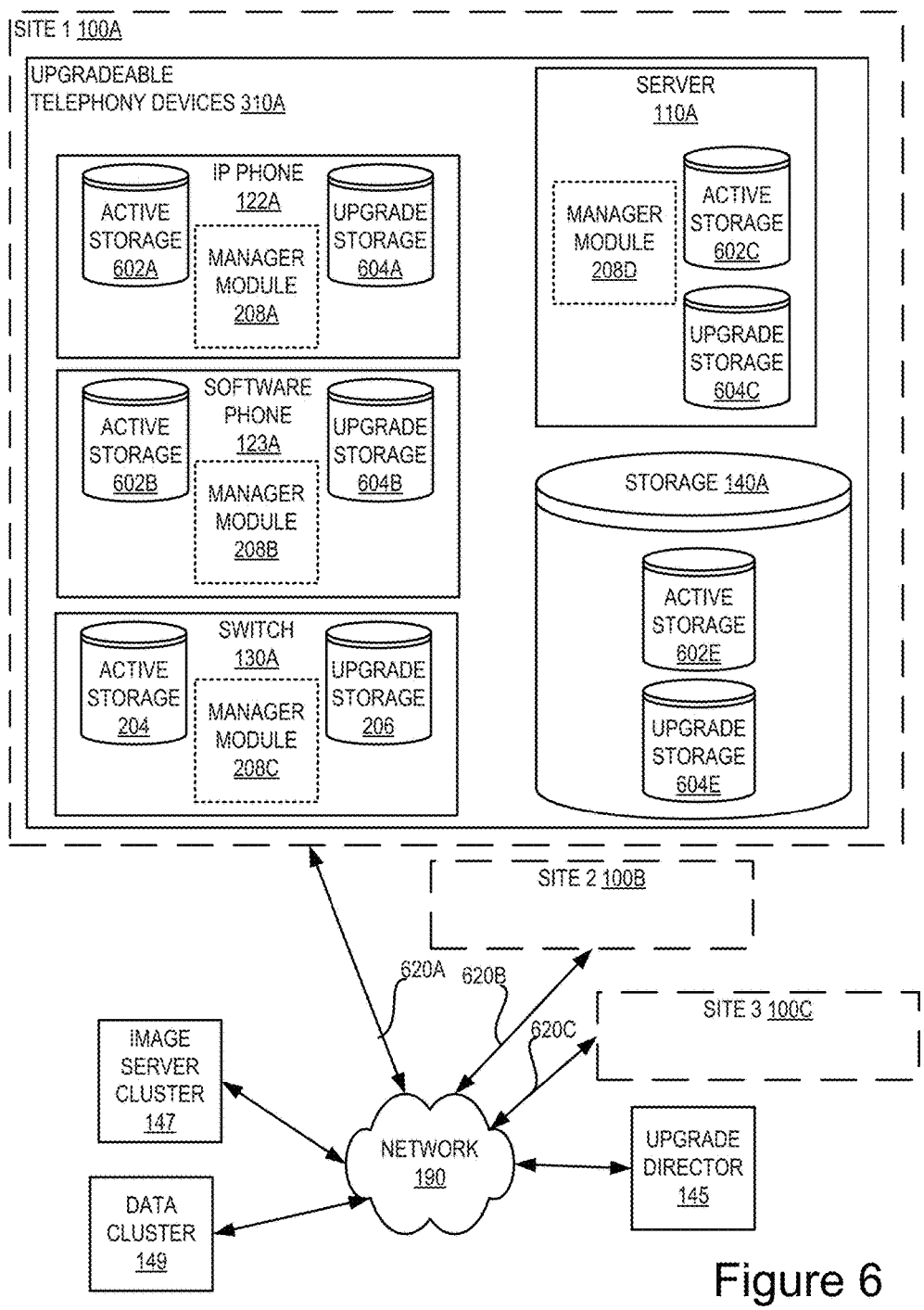
FIG. 6 is a block diagram illustrating upgradable telephony devices according to one embodiment of the present invention.

FIG. 6 depicts an embodiment of the upgradeable telephony devices 310 at the sites 100A, 100B, 100C communicatively coupled to the image server cluster 147, the data cluster 149 and the upgrade director 145 via the network 190. The individual target devices that comprise the upgradeable telephony devices 310 are communicatively coupled to the network 190 via one or more signal lines 620A, 620B, 620C.

In the depicted embodiment, the upgradeable telephony devices 310A comprise the following target devices: an IP phone 122A; a software phone 123A; a switch 130A; a server 110A and a storage device 140A. The individual target devices are coupled to the network 190 via signal line 620A and configured to communicate with the image server cluster 147, the data cluster 149 and the upgrade director 145.

The IP phone 122A, software phone 123A, switch 130A, server 110A, and storage device 140A are similar to those described above for FIGS. 1 and 2. The switch 130A is described above with reference to FIG. 2. Here, the IP phone 122A, software phone 123A, server 110A and storage device 140A comprise an active storage 602 and an upgrade storage 604 similar to the active storage 204 and the upgrade storage 206 described above for FIG. 2. The active storage 602 is a portion of a conventional non-transitory computer readable memory that stores the active image for the target devices. The upgrade storage 604 is a portion of a conventional non-transitory computer readable memory that stores the upgrade image that is downloaded from the image servers 410.

The IP phone 122A, software phone 123A, switch 130A and server 110A further comprise a manager module 208. The manager module 208 is similar to the manager module 208 described above for FIG. 2, so that description will not be repeated here. The manager module 208 includes a schedule module 230 (not pictured). The second site 100B and the third site 100C comprise components similar to the first site 100A, so that description will not be repeated here.

A person having ordinary skill in the art will recognize that the above described system 195 can be used, in one embodiment, to upgrade files or a group of files stored on the target device. For example, the image servers 410 host an upgrade for an application that is stored on the target device. The target device sends a message to the image server 410 indicating that the target devices will download the upgrade for the application. The target devices downloads the upgrade for the application (e.g., using a push or pull methodology known to those having skill in the art) and implements the upgrade application similar to the above-described embodiment related to the upgrade image.

Methods and Examples

Figure 7A:
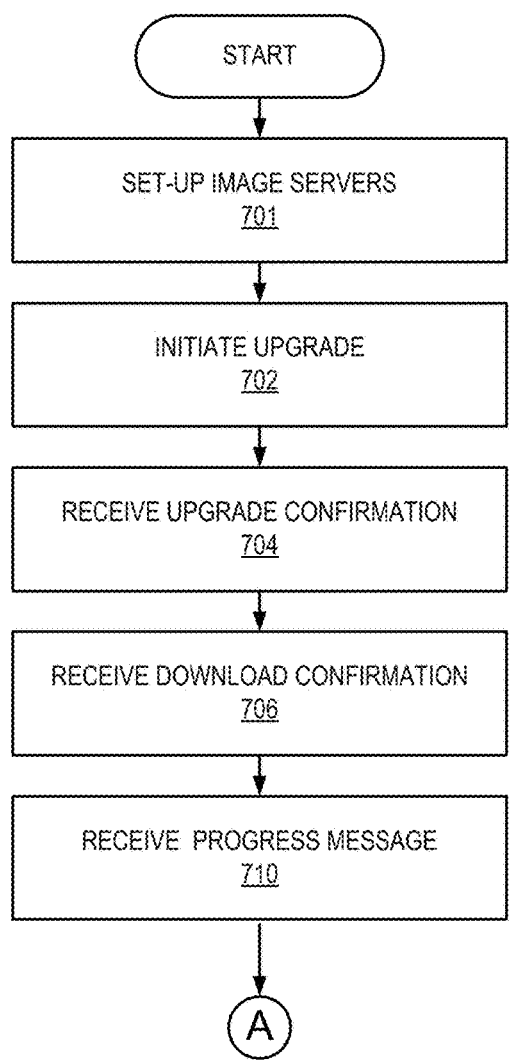
FIGS. 7A and 7B are a flowchart illustrating a method performed by the upgrade director to upgrade the image of upgradable telephony devices according to one embodiment of the present invention.
Figure 7B:
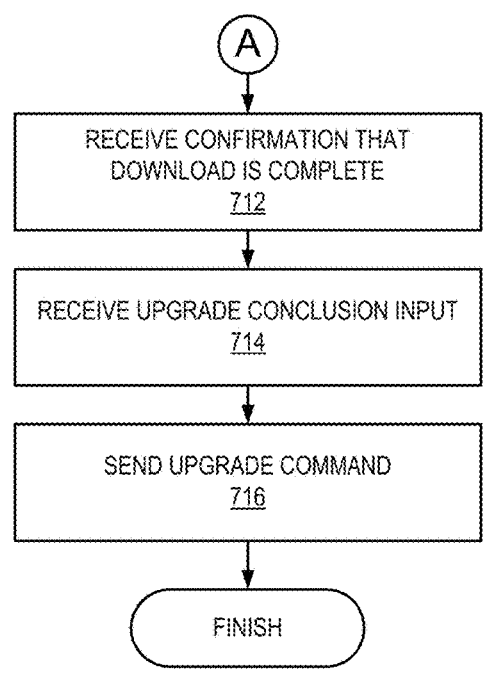

FIGS. 7A, 7B, 8A and 8B depict a flowchart of a method for image upgrade according to one embodiment of the present invention. The method depicted in FIGS. 7A and 7B are performed by the upgrade director 145. The image server module 320 sets up 701 the image servers 410. For example, the image server module 320 determines a nearest image server 410 (e.g., nearest proximity image server 410 as described above) for a target device and sends a message to the target device indicating which server the target device should access for downloading the upgrade image. In one embodiment the target device has information about the hierarchy of the image servers 410 prior to the time of the upgrade and the manager module 208 is configured to calculate the nearest server 410 based on this information. The command module 350 initiates 702 an upgrade event by sending a command to one or more target devices indicating that an upgrade event is to occur. For example, responsive to a user input signal received from the GUI module 360, the command module 350 sends a "prepare to upgrade" command to one or more target devices. The target device receives the "prepare to upgrade" command. Responsive to the "prepare to upgrade" command, the manager module 208 comprised within the target device transmits back to the upgrade director 145 a "firmware mismatch upgrade pending" event signal as a confirmation that the upgrade event will occur. The "firmware mismatch upgrade pending" event signal is referred to herein as a confirmation signal. The upgrade director 145 receives 704 the confirmation signal (e.g., "firmware mismatch upgrade pending" event signal).

The manager module 208 then calculates a delay parameter. The manager module 208 then sends a download confirmation to the upgrade director 145 to confirm that the download is presently occurring. For example, the manager module 208 sends a "firmware mismatch upgrade downloading" event to the upgrade director 145. The upgrade director 145 receives 706 the download confirmation. The upgrade image is stored in the upgrade storage 604 of the target device.

The manager module 208 calculates the progress of the download and sends a progress message to the upgrade director 145. The upgrade director 145 receives 710 the progress message. In one embodiment, the progress report module 370 uses the progress message as progress data that is used to generate progress reports as described for FIG. 3.

The manager module 208 sends a message to the upgrade director 145 confirming that the download is complete. For example, the manager module 208 sends a "firmware mismatch upgrade ready" message to the upgrade director 145. The upgrade director 145 receives 712 the message confirming the completed download of the upgrade image.

The upgrade director 145 receives 714 an upgrade conclusion input from the GUI module 360 indicating that the upgrade event is to conclude. The upgrade conclusion input is generated by the GUI module 360 responsive to the GUI module 360 receiving an input from a human user of the display device 330 indicating that the target device is going to switch to the upgrade image stored in the upgrade storage 604. This input can be provided at the user's convenience any time after the download of the upgrade image to the target device is complete. The command module 350 sends 716 an upgrade command to the target device. The target device receives the upgrade command and switches over to the upgrade image. For example, the target device reboots using the upgrade image stored in the upgrade storage 604.

In one embodiment, the upgrade conclusion input described with reference to step 714 is automatic so that an input from a human user is not required. For example, the upgrade director 145 is configured so the upgrade director 145 (1) receives a message confirming the completed download of the upgrade image; and then automatically (2) retrieves a time delay data stored in storage device 340; and (3) sends the upgrade conclusion input to the manager module 208 after expiration of the predetermined period of time indicated by the time delay data.

In one embodiment, the upgrade directory 145 monitors the image upgrade download for multiple target devices and automatically sends the upgrade conclusion input response to the completion of the downloads for the monitored target devices.

Figure 8A:
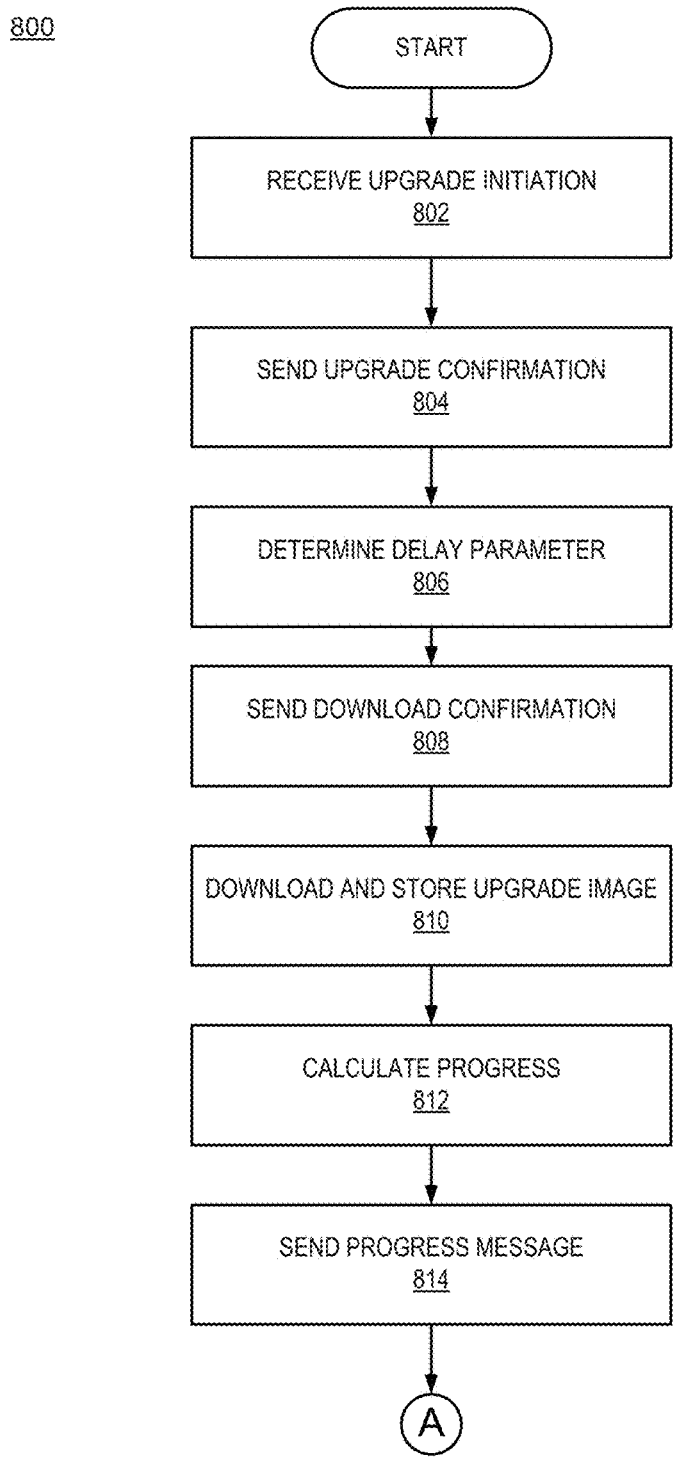
FIGS. 8A and 8B are a flowchart illustrating a method performed by the upgradable telephony devices according to one embodiment of the present invention.
Figure 8B:
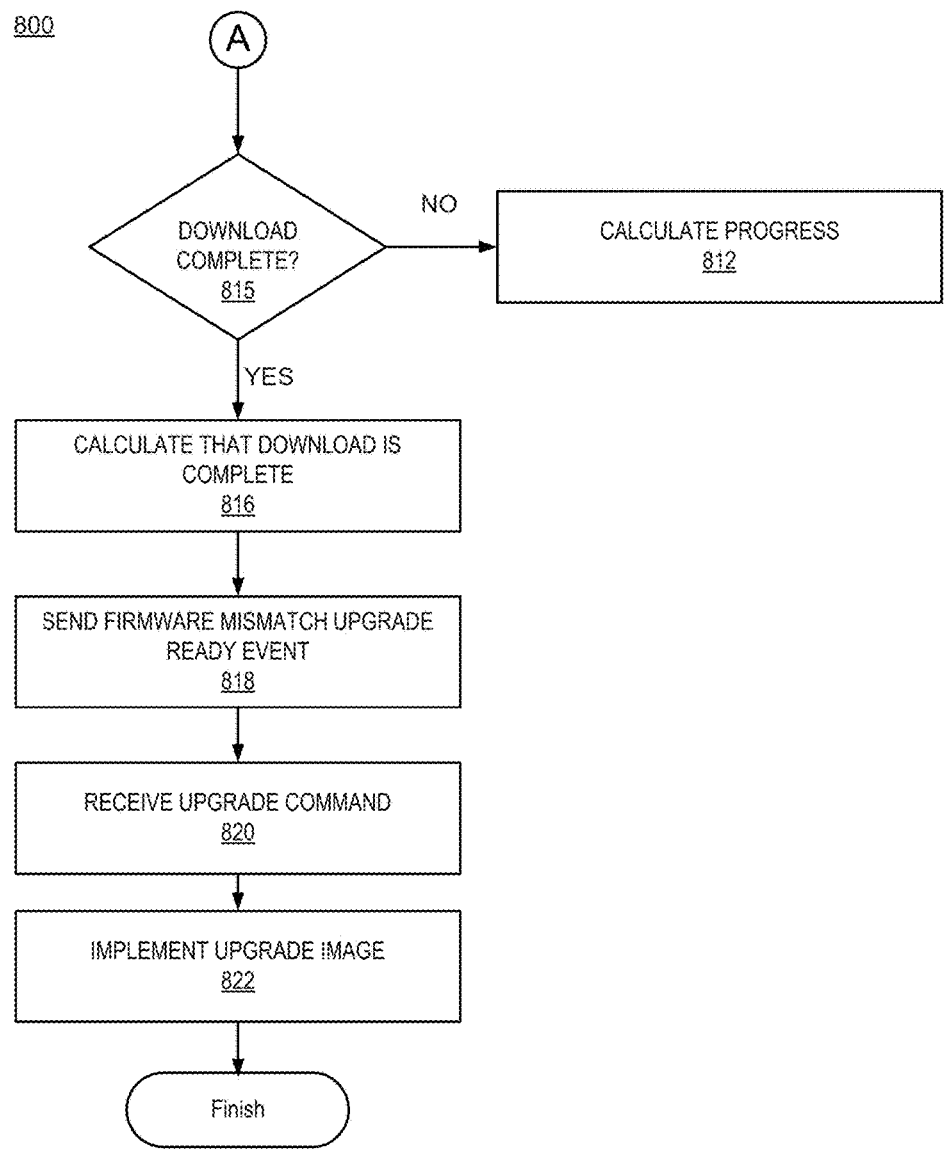

The method depicted in FIGS. 8A and 8B are performed by the target device. The manager module 208 at the target device receives 802 the upgrade initiation signal from upgrade director 145. The manager module 208 sends 804 the upgrade confirmation signal to the upgrade director 145. In one embodiment, the manager module 208 determines whether dual image storage is supported by the target device. If dual image storage is not supported by the target device, the method ends. For example, the manager module 208 sends an error signal to the upgrade director 145. The manager module 208 determines 806 the delay parameter. The manager module 208 sends 808 a confirmation signal that the download is presently occurring to the upgrade director 145. The target device downloads 810 the upgrade image from the image server 410. If the manager module 208 has received a message from the image server module 320 indicating which image server 410 that target device should access for downloading upgrade image, then the target device downloads the upgrade image from the image server 410 indicated by the message ("the image server message"). The target device stores 810 the upgrade image in the upgrade storage 206/604. Since the target device has duel storage capability, the manager module 208 stores the upgrade image in the upgrade storage 206/604 and the active image continues to be stored in the active storage 204/602. The target device continues to operate using the active image for period of time.

The manager module 208 calculates 812 the progress of the download and sends 814 the progress message to the upgrade director 145. The manager module 208 determines 815 whether the download is complete. If the download is not complete, the method returns to step 812. If the download is complete 816, the manager module 208 sends 818 a message to the upgrade director 145 confirming that the download is complete (e.g., a firmware mismatch upgrade ready event). After a lapse of time, the manager module 208 receives 820 the upgrade command from the upgrade director 145. The manager module 208 implements 822 the upgrade image. For example, the manager module 208 causes the target device to reboot using the upgrade image instead of the active image. In one embodiment, the manager module 208 receives a rollback command sent by the command module 350 and the manager module 208 causes the target device to revert back to the active image. For example, the manager module 208 causes the target device to reboot using the active image instead of the upgrade image. In one embodiment, following reversion to the active image, the manager module 208 causes the target device to delete the upgrade image.

As described above, in one embodiment, the target device implements 822 the upgrade image without rebooting the entire target device. For example, the target device stores and executes a shell that boots up an operating system comprised within the target device and implements 822 the upgrade image using the shell as described above.

Figure 9:
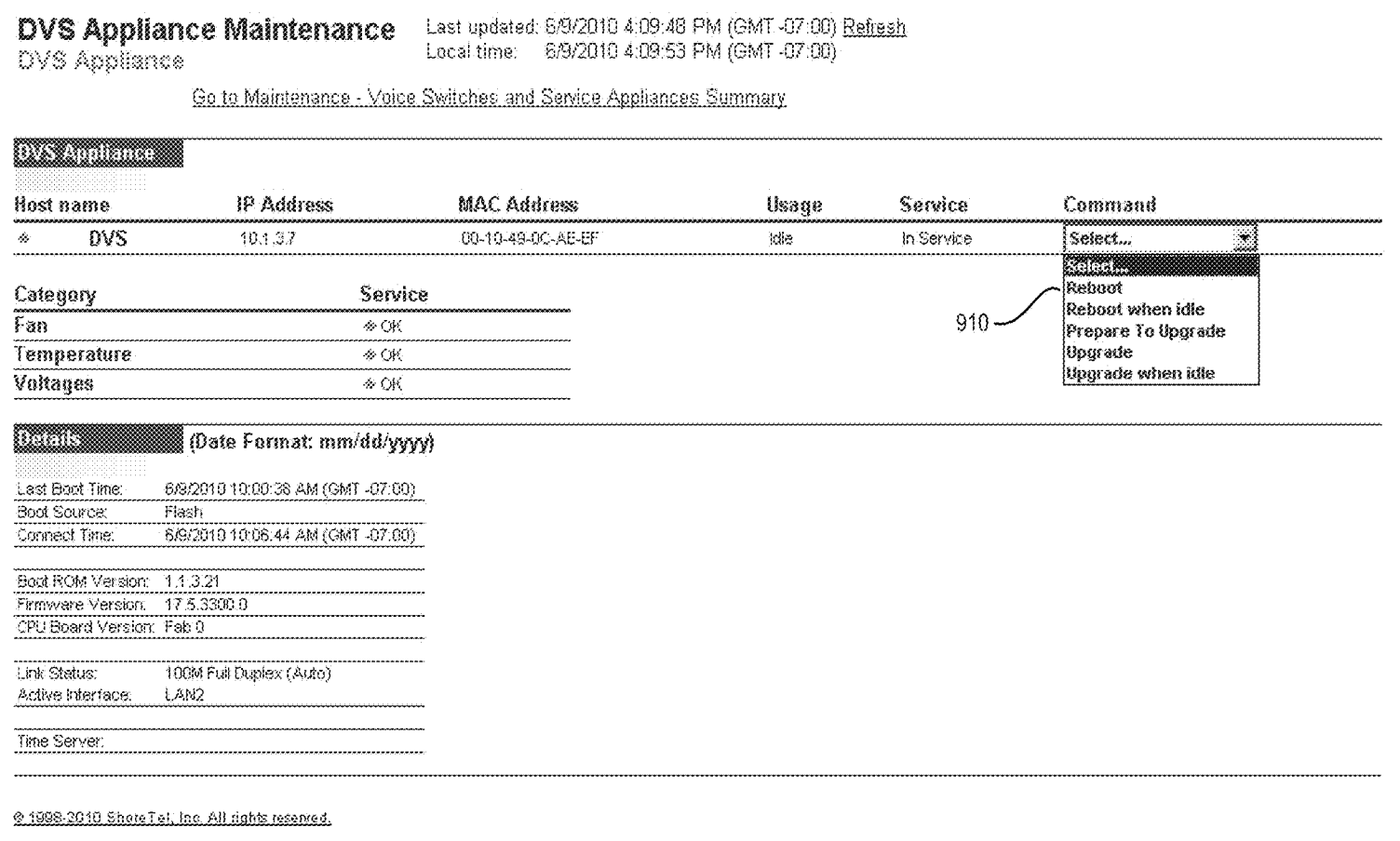

FIG. 9 depicts an GUI generated by the GUI module 360 according to one embodiment. Element 910 is a command drop down box from which a user can select one or more commands to transmit. For example, the user can select the following commands from the command drop down box 910: reboot; reboot when idle; prepare to upgrade; upgrade; upgrade when idle. The reboot command reboots the target device without using the upgrade image. The reboot when idle command reboots the target device after any currently active phone call ends so that a service interruption does not occur. The prepare to upgrade command instructs the target device that it should prepare to upgrade. The upgrade command causes the target device to activate the upgrade image upon receipt. The upgrade when idle command causes the target device to activate the upgrade image after any currently active phone call ends so that a service interruption does not occur.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A system comprising:
   a processor comprising non-transitory computer readable memory for storing instructions to implement:
   an upgrade director comprising:
      a command module code block to issue an upgrade command indicating an upgrade event for a plurality of target devices, wherein the upgrade command is associated with a range of times for the upgrade event to occur; and
      a schedule module code block to:
         determine a delay parameter to specify timing of the upgrade event on each of the target devices the delay parameter is based on a number of upgrade events and information associated with one or more other events occurring contemporaneous to the upgrade event;
         transmit the determined delay parameter to each of the respective target devices;
         schedule times for the upgrade event to occur on each of the target devices using the delay parameter and the range of times for the upgrade event to occur; and
         determine the other events occurring contemporaneous to the upgrade event during the range of times for the upgrade event to occur.

2. The system of claim 1, wherein the schedule module code block determines the delay parameter using a random number generator.

3. The system of claim 1, wherein each of the target devices are rebooted upon downloading the upgrade event.

4. The system of claim 1, wherein the schedule module code block causes a manager module of each of the plurality of target devices to begin downloading an upgrade image from an image server to each of the respective target devices at the scheduled times.

5. The system of claim 4, wherein the schedule module code block waits a period of time specified by the delay parameter before causing each respective target device to initiate the upgrade event and cause the respective target device to download the upgrade image from the image server.

6. The system of claim 4, wherein the plurality of image servers is organized in a hierarchical structure, and wherein, for each respective target device, the upgrade director further comprising an image server module code block that:
   determines a proximity of the respective target device relative to one or more of the plurality of image servers;
   determines which of the plurality of image servers has a nearest proximity to the respective target device in the hierarchical structure; and
   sends a message to the respective target device specifying which image server that the respective target device is to use for downloading the upgrade image to the respective target device.

7. The system of claim 6, wherein each target device receives the message from the upgrade director and stores data specifying from which of the plurality of image servers each respective target device is to use for download the upgrade image, each target device using the stored data to download the upgrade image from the specified image server and at a time consistent with the delay parameter.

8. The system of claim 1, wherein the schedule module code block waits a period of time specified by the delay parameter before causing each respective target device to initiate the upgrade event and cause target device to download the upgrade image from an image server.

9. A method comprising:
   receiving, at an upgrade director, an upgrade command indicating an upgrade event for a plurality of target devices, wherein the upgrade command specifies with a range of times for the upgrade event to occur;
   determining, by the upgrade director, a delay parameter that specifies timing for the upgrade event for each of the target devices, the delay parameter is based on a number of upgrade events and information associated with one or more other events occurring contemporaneous to the upgrade event;

scheduling, by the upgrade director, times for the upgrade event to occur on each of the target devices using the delay parameter and the range of times for the upgrade event to occur; and determining, by the upgrade director, the other events occurring contemporaneous to the upgrade event during the range of times for the upgrade event to occur.

10. The method of claim 9, further comprising downloading the upgrade event to each of the plurality of target devices based on the scheduled times.

11. The method of claim 10, further comprising resetting the plurality of target devices after the download.

12. The method of claim 9, wherein the delay parameter is based on a number of upgrade events and information associated with other events occurring contemporaneously to the upgrade event.

13. The method of claim 12, further comprising determining the number of upgrade events.

14. The method of claim 9, further comprising configuring one or more of the target devices as an image server that stores an upgrade image for the upgrade event.

15. The method of claim 14, wherein the one or more of the target devices satisfies a predetermined processing power and bandwidth threshold before being configured as the image server.

16. The method of claim 14, further comprising downloading a copy of the upgrade image to the one or more target devices configured as the image server prior to allowing the plurality of target devices to download the upgrade images.

17. The method of claim 9, wherein a plurality of image servers are organized in a hierarchical structure, the method further comprising:

determining a proximity of each respective target device relative to one or more of the plurality of image servers;

determining which of the plurality of image servers has a nearest proximity to each respective target device in the hierarchical structure; and sending a message from the upgrade director to each respective target device specifying which image server that each respective target device is to use for downloading an upgrade image to the respective target device.

* * * * *